(12) United States Patent
Shibutani et al.

(10) Patent No.: US 8,163,832 B2
(45) Date of Patent: Apr. 24, 2012

(54) AQUEOUS EMULSION AND USES THEREOF

(75) Inventors: Mitsuo Shibutani, Osaka (JP);
Masahiro Saito, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 0 days.

(21) Appl. No.: 12/226,575

(22) PCT Filed: Apr. 25, 2006

(86) PCT No.: PCT/JP2006/308672
§ 371 (c)(1),
(2), (4) Date: Oct. 22, 2008

(87) PCT Pub. No.: WO2007/129370
PCT Pub. Date: Nov. 15, 2007

(65) Prior Publication Data
US 2010/0029846 A1    Feb. 4, 2010

(51) Int. Cl.
*C08L 29/04* (2006.01)
(52) U.S. Cl. .......................... 524/503; 524/459; 525/57
(58) Field of Classification Search .................. 524/459, 524/503; 525/57
See application file for complete search history.

(56) References Cited

U.S. PATENT DOCUMENTS

| | | | | |
|---|---|---|---|---|
| 6,495,623 | B1 * | 12/2002 | Tanimoto et al. | 524/459 |
| 6,706,805 | B2 * | 3/2004 | Weitzel | 524/563 |
| 2003/0164478 | A1 * | 9/2003 | Fiedler et al. | 252/500 |
| 2008/0293884 | A1 * | 11/2008 | Tanimoto et al. | 524/852 |

FOREIGN PATENT DOCUMENTS

| | | |
|---|---|---|
| JP | 8-325310 | 12/1996 |
| JP | 2000-313721 | 11/2000 |
| JP | 2002-241433 | 8/2002 |
| JP | 2002-284818 | 10/2002 |
| JP | 2003-171522 | 6/2003 |
| JP | 2003-171567 | 6/2003 |
| JP | 2003171522 A * | 6/2003 |
| JP | 2003-277419 | 10/2003 |
| JP | 2004-18692 | 10/2004 |
| JP | 2004-300193 | 10/2004 |
| JP | 2004-300193 A | 10/2004 |
| JP | 2005-042036 | 2/2005 |
| JP | 2005-330394 | 12/2005 |
| JP | 2006-96822 | 4/2006 |
| JP | 2006-124682 | 5/2006 |
| WO | 2006/018870 | 2/2006 |

OTHER PUBLICATIONS

Russian Office Action issued in Russian Application No. 2008141269/04(053515), mailed Mar. 2, 2010, with a full English translation—10 pages.
Office Action of Chinese Application No. 200680054354.8 dated Apr. 13, 2010, 5 pages.

* cited by examiner

*Primary Examiner* — David W Wu
*Assistant Examiner* — Marie Reddick
(74) *Attorney, Agent, or Firm* — Hamre, Schumann, Mueller & Larson, P.C.

(57) ABSTRACT

The invention is to provide: an aqueous emulsion which is excellent in emulsion polymerization stability when produced, and is excellent in mechanical stability, freezing stability, stability to long-term standing at high temperatures, water resistance adhesive property, and redispersibility; and a redispersible resin and adhesive where the aqueous emulsion is used. The invention relates to an aqueous emulsion comprising a polyvinyl alcohol-based resin (A) comprising a 1,2-diol component in a side chain and having an average degree of polymerization of 50 to 2,500 and a polymer (B) comprising at least one unsaturated monomer selected from an ethylenically unsaturated monomer and a diene-based monomer.

5 Claims, No Drawings

AQUEOUS EMULSION AND USES THEREOF

TECHNICAL FIELD

The present invention relates to an aqueous emulsion, more particularly, an aqueous emulsion which is excellent in emulsion polymerization stability when produced, and is excellent in mechanical stability, freezing stability, stability to long-term standing at high temperatures, and water resistance adhesive property, and also can be converted, by removing water, into a powder which, upon redispersion in water, gives an emulsion having excellent mechanical stability. The invention further relates to a redispersible resin powder and adhesive where the aqueous emulsion is used.

BACKGROUND ART

A polyvinyl alcohol-based resin (hereinafter, polyvinyl alcohol is often abbreviated to PVA) has hitherto been advantageously used as a dispersion stabilizer in emulsion polymerization of a vinyl acetate-based monomer and an acrylic-based monomer.

Furthermore, various modified PVA-based resins are being investigated for the purpose that the aqueous emulsion obtained is improved in mechanical stability, freezing stability, and high-temperature standing stability. For example, such aqueous emulsions which have been proposed include: an aqueous emulsion comprising a PVA-based polymer having a mercapto group at a molecular end, a surfactant, and a polymer mainly comprising an ethylenically unsaturated monomer unit and having an average particle diameter of 0.3 µm or less (see, for example, patent document 1); an aqueous emulsion in which a PVA-based resin having a block character [η] of more than 0.6 and a degree of saponification of more than 95.0% by mole and having an active hydrogen in the molecule is adhered to the surface of the polymer particle (see, for example, patent document 2); and an acrylic-based copolymer emulsion obtained by using an amide-modified PVA as a protective-colloid stabilizer (see, for example, patent document 3).

Patent Document 1: JP-A-2003-171567
Patent Document 2: JP-A-2003-277419
Patent Document 3: JP-A-2004-018692

DISCLOSURE OF THE INVENTION

Problem to be Solved by the Invention

However, detailed investigations made by the present inventors on those known techniques revealed the following. Although all those aqueous emulsions have been considerably improved in mechanical stability and freezing stability, there still is room for improvement in stability to high-temperature and long-term standing when the level required in the market is taken into account. Namely, there is a desire for an aqueous emulsion which is excellent in mechanical stability and freezing stability and further has improved stability to long-term standing at high temperature.

Means for Solving the Problem

The present inventors diligently made investigations under these circumstances. As a result, it has been found that an aqueous emulsion comprising a PVA-based resin (A) comprising a 1,2-diol component in a side chain and having an average degree of polymerization of 50 to 2,500 and a polymer (B) comprising at least one unsaturated monomer selected from an ethylenically unsaturated monomer and a diene-based monomer coincides with the above objective. The invention has been thus completed.

The PVA-based resin (A) comprising a 1,2-diol component in a side chain preferably is a PVA-based resin (A) comprising a 1,2-diol structure unit represented by general formula (1).

[Ka-1]

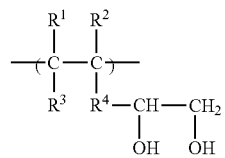

(1)

(In the formula, $R^1$, $R^2$, and $R^3$ each independently represent a hydrogen atom or an alkyl group, and $R^4$ represents a single bond or an alkylene group having 1 to 3 carbon atoms which may have an alkyl group.)

Furthermore, the polymer (B) preferably is one obtained by emulsion-polymerizing at least one unsaturated monomer selected from an ethylenically unsaturated monomer and a diene-based monomer in the presence of the PVA-based resin (A) as an emulsifier.

Advantages of the Invention

The aqueous emulsion of the invention is excellent in emulsion polymerization stability when produced, and is excellent in mechanical stability, freezing stability, and high-temperature standing stability, and also can be converted into a powder by removing water. The redispersion emulsion also has satisfactory mechanical stability. Furthermore, an adhesive having excellent water resistance adhesive property is obtained.

BEST MODE FOR CARRYING OUT THE INVENTION

The PVA-based resin (A) comprising a 1,2-diol component in a side chain to be used in the invention is explained below in detail.

The PVA-based resin (A) to be used in the invention is a PVA-based resin comprising a 1,2-diol component in a side chain.

Specifically, it may be a PVA-based resin having a 1,2-diol structure unit represented by the following general formula (1).

[Ka-2]

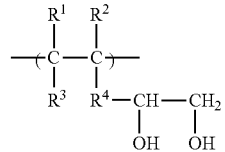

(1)

In general formula (1), $R^1$, $R^2$, and $R^3$ each independently is hydrogen or an alkyl group. The alkyl group is not particularly limited. However, an alkyl group having 1 to 4 carbon atoms, such as a methyl group, an ethyl group, an n-propyl group, an isopropyl group, an n-butyl group, an isobutyl group or a tert-butyl group, is preferred. This alkyl group may have a substituent such as a halogen group, a hydroxyl group, an ester group, a carboxylic acid group, a sulfonate group and the like according to need. $R^4$ represents a single bond or an alkylene group having 1 to 3 carbon atoms which may have an alkyl group.

Methods for obtaining this PVA-based resin are not particularly limited. However, it is preferred to use a method in which a copolymer of a vinyl ester-based monomer and a compound represented by the following general formula (2) is saponified.

[Ka-3]

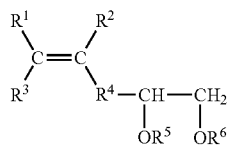

(2)

In general formula (2), $R^1$, $R^2$, $R^3$, and $R^4$ represent the same members as in general formula (1). $R^5$ and $R^6$ each independently are hydrogen or $R^7$—CO— (wherein $R^7$ is an alkyl group, preferably a methyl group, a propyl group, a butyl group, a hexyl group or an octyl group, and this alkyl group may have a substituent such as a halogen group, a hydroxyl group, an ester group, a carboxylic acid group, a sulfonate group and the like according to need).

Examples of the compound represented by formula (2) include 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diacyloxy-1-pentene, 4,5-dihydroxy-3-methyl-1-pentene, 4,5-diacyloxy-3-methyl-1-pentene, 5,6-dihydroxy-1-hexene, and 5,6-diacyloxy-1-hexene. Of these, one in which $R^1$, $R^2$, and $R^3$ each are hydrogen, $R^4$ is a single bond, and $R^5$ and $R^6$ each are $R^7$—CO— wherein $R^7$ is an alkyl group, i.e., 3,4-diacyloxy-1-butene, is preferred because this is excellent in copolymerizability and industrial handleability. Especially preferred of these is one in which $R^7$ is a methyl group, i.e., 3,4-diacetoxy-1-butene.

Incidentally, a product of 3,4-diacetoxy-1-butene manufactured by Eastman Chemical Company and Across Inc. is available on the market.

Examples of the vinyl ester-based monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, and vinyl versatate. From the economical standpoint, it is preferred to use vinyl acetate among these.

In the invention, other monomers can be copolymerized, other than the above comonomer ingredients, in an amount of about 0.5 to 10% by mole so long as this does not defeat the object of the invention. Examples thereof include olefins such as ethylene, propylene, isobutylene, α-octene, α-dodecene, and α-octadecene, unsaturated acids such as acrylic acid, methacrylic acid, crotonic acid, maleic acid, maleic anhydride, and itaconic acid and salts or mono- or dialkyl ester thereof, nitriles such as acrylonitrile and methacrylonitrile, amides such as diacetone acrylamide, acrylamide, and methacrylamide, olefinsulfonic acids such as ethylenesulfonic acid, allylsulfonic acid, and methallylsulfonic acid and salts thereof, alkyl vinyl ethers, dimethylallyl vinyl ketone, N-vinylpyrrolidone, vinyl chloride, vinylidene chloride, polyoxyalkylene(meth)allyl ether such as polyoxyethylene(meth)allyl ether and polyoxypropylene(meth)allyl ether, polyoxyalkylene(meth)acrylate such as polyoxyethylene (meth)acrylate and polyoxypropylene(meth)acrylate, polyoxyalkylene(meth)acrylamide such as polyoxyethylene (meth)acrylamide and polyoxypropylene(meth)acrylamide, polyoxyethylene (1-(meth) acrylamido-1,1-dimethylpropyl) ester, polyoxyethylene vinyl ether, polyoxypropylene vinyl ether, polyoxyethyleneallylamine, polyoxypropyleneallylamine, polyoxyethylenevinylamine, and polyoxypropylenevinylamine.

Examples thereof further include a cationic group-containing monomer, such as N-acrylamidomethyltrimethylammonium chloride, N-acrylamidoethyltrimethylammonium chloride, N-acrylamidopropyltrimethylammonium chloride, 2-acryloxyethyltrimethylammonium chloride, 2-methacryloxyethyltrimethylammonium chloride, 2-hydroxy-3-methacryloyloxypropyltrimethylammonium chloride, allyltrimethylammonium chloride, methallyltrimethylammonium chloride, 3-butenetrimethylammonium chloride, dimethyldiallylammonium chloride, and diethyldiallylammonium chloride, an acetoacetyl group-containing monomer, ethylene carbonate, vinylethylene carbonate, isopropenyl acetate, and 1-methoxyvinyl acetate.

In copolymerizing the above vinyl ester monomer with the compound represented by formula (2) (and optionally with other monomers), a known technique such as, bulk polymerization, solution polymerization, suspension polymerization, dispersion polymerization or emulsion polymerization, can be employed without particular limitations. In general, the solution polymerization is conducted.

Methods for adding a monomer ingredient in copolymerization are not particularly limited, and any desired method may be used by, such as adding all at once, adding divisionally or adding continuously. However, dropping polymerization is preferred from the standpoint that the compound represented by formula (2) can be evenly distributed in the molecular chain of the polyvinyl ester-based polymer. In particular, a polymerization method based on a HANNA method is preferred.

Examples of solvents usable in the copolymerization generally include lower alcohol such as methanol, ethanol, isopropyl alcohol, n-propanol and butanol, and ketones such as acetone and methyl ethyl ketone. Industrially, methanol is preferably used.

The amount of the solvent to be used may be suitably selected according to the target degree of polymerization of the copolymer while taking account of a chain transfer constant of the solvent. For example, in the case where the solvent is methanol, the amount thereof may be selected in the range of about 0.01 to 10 (weight ratio) in terms of S (solvent)/M (monomer), preferably about 0.05 to 3 (weight ratio).

A polymerization catalyst is used in the copolymerization. Examples of the polymerization catalyst include a known radical polymerization catalyst such as azobisisobutyronitrile, acetyl peroxide, benzoyl peroxide and lauryl peroxide and low-temperature-active radical polymerization catalyst such as azobisdimethylvaleronitrile and azobismethoxydimethylvaleronitrile. The amount of the polymerization catalyst to be used cannot be unconditionally determined because it varies depending on the kind of the catalyst. However, the catalyst may be selected in any desired amount according to polymerization rate. For example, in the case of using azoisobutyronitrile or acetyl peroxide, it is preferably 0.01 to 0.2% by mole, especially preferably 0.02 to 0.15% by mole, based on the vinyl ester-based monomer.

The copolymerization reaction may be conducted at a temperature of from 30° C. to about a boiling point according to the solvent used and pressure. More specifically, the copolymerization may be conducted at a temperature in the range of 35 to 150° C., preferably 40 to 75° C.

In the invention, although a proportion of copolymerization of the compound represented by formula (2) is not particularly limited, it may be determined according to the amount of the 1,2-diol component to be incorporated which will be described later.

Subsequently, the copolymer obtained is saponified. In the saponification, the copolymer obtained above is dissolved in alcohol or hydrous alcohol and then conducted by using an alkali catalyst or an acid catalyst. Examples of the alcohol include methanol, ethanol, propanol and tert-butanol, and methanol is especially preferably used. The concentration of the copolymer in the alcohol may be suitably selected according to a viscosity of the system. However, the concentration thereof is generally selected in the range of 10 to 60% by weight. Examples of the catalyst to be used in the saponification include an alkali catalyst such as a hydroxide and alcoholate of an alkali metal, e.g., sodium hydroxide, potassium hydroxide, sodium methylate, sodium ethylate, potassium methylate and lithium methylate, and an acid catalyst such as sulfuric acid, hydrochloric acid, nitric acid, methanesulfonic acid, a zeolite, and a cation-exchange resin.

The amount of the saponification catalyst to be used may be suitably selected according to the method of saponification, target degree of saponification, etc. However, in the case of using an alkali catalyst, a suitable proportion thereof is generally 0.1 to 30 mmol, preferably 2 to 17 mmol, based on 1 mol of the sum of the vinyl ester-based monomer and the compound represented by formula (2).

When the PVA-based resin (A) comprising a 1,2-diol component in a side chain is obtained by saponifying the copolymer of the vinyl ester-based monomer and the compound represented by formula (2), an ester moiety of the vinyl ester-based monomer and an ester moiety of the compound represented by formula (2) are simultaneously converted to a hydroxyl group. Since the PVA-based resin (A) is thus produced, a feature of this process resides in that a by-product such as dimethyl carbonate, which is a defect associated with the use of vinylethylene carbonate, is not generated In the PVA-based resin (A) thus obtained, a content of the 1,2-diol component present in a side chain thereof is not particularly limited. However, it is preferred that the content thereof should be 1 to 15% by mole (more preferably 1 to 12% by mole, especially 2 to 10% by mole, in particular 2 to 8% by mole). Too low content of the 1,2-diol component is undesirable because the effects and advantages of the invention are not sufficiently obtained. Conversely, too high content thereof is undesirable because an unsaturated monomer has reduced polymerization stability when emulsion polymerized.

The PVA-based resin (A) of the invention is necessary to have an average degree of polymerization (determined in accordance with JIS K6726) of 50 to 2,500 (preferably 100 to 1,700, especially 100 to 1,000, in particular 200 to 500). The PVA-based resin having an average degree of polymerization of lower than 50 is unsuitable because such a PVA-based resin is difficult to be produced industrially. Conversely, such a PVA-based resin having too high an average degree of polymerization is unsuitable because a viscosity of the aqueous emulsion obtained is too high and polymerization stability during emulsion polymerization decreases.

This PVA-based resin (A) preferably is one in which the amount of a residual ester group remaining unsaponified is 15% by mole or less (more preferably 10% by mole or less). Too large the amount of the residual ester group is undesirable because polymerization stability during emulsion polymerization decreases considerably and there are cases where the target aqueous emulsion is not obtained.

That amount of the residual ester group in the PVA-based resin (A) is expressed in terms of a proportion (% by mole) of an unsaponified moiety to the ester moiety of the vinyl ester monomer and the ester moiety of the compound represented by the formula (1).

The polymer (B) is explained below.

The polymer (B) is a polymer obtained by polymerizing at least one unsaturated monomer selected from an ethylenically unsaturated monomer and a diene-based monomer. Examples of the ethylenically unsaturated monomer and diene-based monomer mainly include a monomer frequently used for emulsion polymerization, such as a vinyl ester-based monomer, acrylic acid or an ester-based monomer thereof, and a diene-based monomer. Examples of the other monomer include an olefin-based monomer, an acrylamide-based monomer, an acrylonitrile-based monomer, a styrene-based monomer, a vinyl ether-based monomer, and an allyl-based monomer.

Examples of the vinyl ester-based monomer include vinyl formate, vinyl acetate, vinyl propionate, vinyl valerate, vinyl butyrate, vinyl isobutyrate, vinyl pivalate, vinyl caprate, vinyl laurate, vinyl stearate, vinyl benzoate, vinyl versatate, 1-methoxyvinyl acetate, and isopropenyl acetate. Examples of the acrylic acid or the ester-based monomer thereof include methyl(meth)acrylate, ethyl(meth)acrylate, n-propyl(meth)acrylate, i-propyl(meth)acrylate, n-butyl(meth)acrylate, i-butyl(meth)acrylate, t-butyl(meth)acrylate, 2-ethylhexyl (meth)acrylate, dodecyl(meth)acrylate, octadecyl(meth)acrylate, and (meth) acrylic acid. Examples of the diene-based monomer include butadiene-1,3,2-methylbutadiene, 1,3- or 2,3-dimethylbutadiene-13, and 2-chlorobutadiene-1,3.

Examples of the olefin-based monomer include an olefin-based monomer such as ethylene, propylene, 1-butene and isobutene, and halogenated olefins such as vinyl chloride, vinylidene chloride, vinyl fluoride and vinylidene fluoride. Examples of the acrylamide-based monomer include (meth)acrylamide, N-methylolacrylamide, N,N-dimethylacrylamide, acrylamido-2-methylpropanesulfonic acid and diacetone acrylamide.

Examples of the acrylonitrile-based monomer include (meth)acrylonitrile. Examples of the styrene-based monomer include styrene and α-methylstyrene. Examples of the vinyl ethers include methyl vinyl ether, n-propyl vinyl ether, i-propyl vinyl ether, n-butyl vinyl ether, i-butyl vinyl ether, t-butyl vinyl ether, dodecyl vinyl ether and stearyl vinyl ether. Examples of the allyl-based monomer include allyl acetate and allyl chloride.

Further examples include a carboxyl group-containing compound such as fumaric acid, maleic acid (anhydride), itaconic acid (anhydride), and trimellitic acid anhydride and esters thereof, a sulfonic group-containing compound such as ethylenesulfonic acid, allylsulfonic acid, methallylsulfonic acid and 2-acrylamido-2-methylpropanesulfonic acid, a vinylsilane compound such as vinyltrimethoxysilane, isopropenyl acetate, and 3-(meth)acrylamidopropyltrimethylammonium chloride.

Preferred of those are the (meth)acrylic acid or the ester-based monomer thereof, the styrene-based monomer thereof, and the butadiene-based monomer thereof from the standpoint of the alkali resistance of the aqueous emulsion.

Although the ethylenically unsaturated monomer and diene-based monomer can be subjected alone to polymerization, a mixture of two or more thereof can, of course, be subjected to polymerization (copolymerization).

A process for producing the aqueous emulsion of the invention is explained next.

For obtaining the aqueous emulsion, use may be made of techniques such as emulsion polymerization and a postemulsification method. For conducting the former, i.e., the emulsion polymerization, use can be made of (i) an ordinary emulsion polymerization method in which an ethylenically unsaturated monomer and/or a diene-based monomer is added at a time or continuously in the presence of water, a PVA-based resin, and a polymerization catalyst and then it is heated and stirred, or (ii) an emulsion polymerization method in which a dispersion solution (pre-emulsion) prepared by mixing and dispersing an ethylenically unsaturated monomer and/or a diene-based monomer in an aqueous solution of a PVA-based resin is added at a time or continuously in the presence of water, a PVA-based resin, and a polymerization catalyst and then it is heated and stirred.

The amount of the PVA-based resin (A) to be used varies slightly depending on the kind of the resin, a resin content of the emulsion, etc. However, it is generally preferred that the amount thereof should be 0.1 to 30% by weight (more preferably 1 to 25% by weight, especially 2 to 20% by weight) based on the whole emulsion polymerization reaction system. The amount of less than 0.1% by weight is undesirable because it is difficult to keep the polymer particle in a stable emulsified state. Conversely, the amount of more than 30% by weight is undesirable because the viscosity of the emulsion is too high and this results in reduced workability and too low water resistance.

As the polymerization initiator, it is general that potassium persulfate, ammonium persulfate, potassium bromate, or the like is used alone or in combination with acid sodium sulfite. Furthermore, a water-soluble redox-system polymerization initiator may be used, such as hydrogen peroxide/tartaric acid, hydrogen peroxide/iron salt, hydrogen peroxide/ascorbic acid/iron salt, hydrogen peroxide/Rongalit or hydrogen peroxide/Rongalit/iron salt. Specifically, a catalyst comprising an organic peroxide and a redox system may be used, such as "Kayabutyl B" or "Kayabutyl A-50C" each manufactured by Kayaku Akzo Co., Ltd.

Methods for adding the polymerization initiator are not particularly limited. Use may be made of, e.g., a method in which the polymerization initiator is added all at once in the beginning or a method in which the polymerization initiator is added continuously with the progress of polymerization.

In the above emulsion polymerization, a water-soluble polymer, a nonionic surfactant, or an anionic surfactant may also be used as a dispersion stabilizer.

Examples of the water-soluble polymer include PVA other than the PVA-based resin (A) described above, such as unmodified PVA, carboxyl group-containing PVA, formalized PVA, acetalized PVA, butyralized PVA, urethanated PVA and PVA esterified with an acid such as sulfonic acid or carboxylic acid, and a saponified copolymer of vinyl ester and a monomer copolymerizable therewith. Examples of the monomer copolymerizable with the vinyl ester include olefins such as ethylene, butylene, isobutylene, α-octene, α-dodecene, and α-octadecene, an unsaturated acid such as acrylic acid, methacrylic acid, crotonic acid, maleic acid, maleic anhydride, and itaconic acid or salts or mono- or dialkyl ester of thereof, nitriles such as acrylonitrile and methacrylonitrile, amides such as acrylamide, diacetone acrylamide and methacrylamide, olefinsulfonic acid such as ethylenesulfonic acid, allylsulfonic acid, and methallylsulfonic acid and salts thereof, alkyl vinyl ethers, vinyl ketone, N-vinylpyrrolidone, vinyl chloride, and vinylidene chlorides.

Examples of the water-soluble polymer other than the above PVA include cellulose derivatives such as methyl cellulose, ethyl cellulose, hydroxymethyl cellulose, hydroxypropyl methyl cellulose, hydroxybutyl methyl cellulose, hydroxyethyl cellulose, carboxymethyl cellulose, aminomethyl hydroxypropyl cellulose and aminoethyl hydroxypropyl cellulose, starch, tragacanth, pectin, glue, alginic acid or salts thereof, gelatin, polyvinylpyrrolidone, polyacrylic acid or salts thereof, polymethacrylic acid or salts thereof, polyacrylamide, polymethacrylamide, a copolymer of vinyl acetate and an unsaturated acid such as maleic acid, maleic anhydride, acrylic acid, acrylic acid, methacrylic acid, itaconic acid, fumaric acid or crotonic acid, a copolymer of styrene and the above unsaturated acid, a copolymer of vinyl ether and the above unsaturated acid, and salts or esters of the above copolymers.

Examples of the nonionic surfactant include, for example, a polyoxyethylene-alkyl ether type, a polyoxyethylene-alkylphenol type, a polyoxyethylene-polyhydric alcohol ester type, ester of polyhydric alcohol with fatty acid, and an oxyethylene/oxypropylene block polymer.

Examples of the anionic surfactant include a sulfate of higher alcohol, an alkali salt of higher fatty acid, a sulfate of polyoxyethylene alkylphenol ether, a sulfonate of alkylbenzene, a naphthalenesulfonate/formalin condensate, a sulfonate of alkyldiphenyl ether, a dialkyl sulfosuccinate, and a higher alcohol phosphoric ester salt.

Furthermore, a plasticizer such as phthalic ester or phosphoric ester, and a pH regulator such as sodium carbonate, sodium acetate or sodium phosphate, may also be used.

The polymer particle has an average particle diameter of preferably 200 nm or more (more preferably 300 nm or more).

By regulating the average particle diameter to 200 nm or more, an emulsion having a minimum film-forming temperature (MFT) of 10° C. or more is obtained. This emulsion has improved mechanical stability.

The average particle diameter in this case means a number average particle diameter (Dn) measured by using a dynamic light-scattering photometer "DLS-700", manufactured by Otsuka Electronics Co., Ltd., under the following conditions and calculated by a histogram method.

(Condition for Measurement Sample)

An EM was diluted with ion-exchanged water so as to give a 0.05% by weight aqueous solution.

(Conditions for Measurement with "DLS-700")

A slit-switching knob (Φ0.1 to Φ0.2) and an ND filter pinch (ND50 to ND25) were regulated so as to give a CPS value (quantity of light) of 5,000 to 12,000, and a measurement was performed under the following conditions.

SAMPLING TIME (standard clock): 40 μsec

ACCUM. TIMES (number of integrations): 100 times

CORRE. CH (set value for converging correlation function): 256

For the purpose of further improving the polymerization stability and mechanical stability of the emulsion, it is preferred to cause a water-soluble polymerization inhibitor to coexist, in an amount of 10 to 500 ppm (more preferably 10 to 200 ppm) based on the monomer, with the PVA-based resin (A) as an emulsifier.

The water-soluble polymerization inhibitor is not particularly limited. Examples thereof include a thiocyanic acid salt, a nitrous acid salt, and a water-soluble sulfur-containing organic compound. Examples of the thiocyanic acid salt include ammonium thiocyanate, zinc thiocyanate, sodium thiocyanate, potassium thiocyanate, and aluminum thiocyanate. Examples of the nitrous acid salt include sodium nitrite, potassium nitrite, ammonium nitrite, calcium nitrite, silver nitrite, strontium nitrite, cesium nitrite, barium nitrite, magnesium nitrite, lithium nitrite, and dicyclohexylammonium nitrite. Examples of the water-soluble sulfur-containing organic compound include hydroxyl group-substituted mercaptan such as mercaptoethanol, monothiopropylene glycol, and thioglycerol; mercaptocarboxylic acid such as thioglycolic acid, thiohydracrylic acid, thiolactic acid, and thiomaleic acid; amino-substituted mercaptan such as thioethanolamine; nitro-substituted mercaptan such as β-nitroethyl mercaptan; hydroxyl group-substituted bivalent mercaptan such as 1,2-dithioglycerol and 1,3-dithioglycerol; dimercaptoketones such as 1,3-dimercaptoacetone; dimercaptocarboxylic acid such as β,β-dithioisobutyric acid; hydroxyl group-substituted sulfide such as thioglycol; hydroxyl group-substituted sulfide such as thiodiglycol; sulfidecarboxylic acid such as thiodiglycolic acid, β,β-thiodipropionic acid, and thiodilactic acid; aldehyde-substituted sulfide such as β-methylthiopropionaldehyde; amino-substituted sulfide such as β-aminoethyl sulfide; nitro-substituted sulfide such as β-nitroethyl sulfide; and mercapto-substituted sulfide such as β-mercaptoethyl sulfide. The timing of adding the water-soluble polymerization inhibitor is preferably in the range of 5 to 75% in terms of a polymerization inversion rate of the acrylic-based monomer. In case where it is added earlier than 5%, the polymerization system causes a dispersion defect to give an acrylic-based emulsion comprising a larger amount of coarse particles. On the other hand, it is added later than 75%, it is undesirable from the standpoint of the effects of inhibiting coarse particles from generating in the acrylic-based emulsion and of improving mechanical stability.

In the case where a water-soluble polymerization inhibitor is added, the polymerization initiator is preferably oil soluble. It is more preferred to dissolve in a monomer beforehand because this is effective in inhibiting the formation of a coarse particle.

The oil-soluble polymerization initiator is not particularly limited. Examples thereof include a peroxydicarbonate compound such as diisopropyl peroxydicarbonate, di-2-ethylhexyl peroxydicarbonate, and diethoxyethyl peroxydicarbonate; a peroxyester compound such as t-butyl peroxyneodecanoate and α-cumyl peroxyneodecanoate; a peroxide such as acetyl cyclohexylsulfonyl peroxide; and an azo compound such as azobisisobutyronitrile, azobis-2,4-dimethylvaleronitrile, and azobis(4-methoxy-2,4-dimethylvaleronitrile).

According to need, any of a nonionic surfactant such as polyoxyethylene-alkyl ether type, polyoxyethylene-alkylphenol type and polyhydric alcohol ester type, a cationic surfactants such as a higher alkylamine salt, and the other various surfactants for use in emulsion polymerization described above can also be used in combination. It is possible to mix these surfactants beforehand in a target to be emulsified. Furthermore, a pH regulator such as a phthalic ester, sodium acetate, or sodium phosphate can also be used in combination.

An additive according to various applications can be suitably mixed in the aqueous emulsion to be obtained, according to need. Examples thereof include a crosslinking agent, a water resistance additive, a pigment, a dispersant, an anti-foamer, an oil solution, a viscosity modifier, a tackifier, a thickener, a water-holding agent, a fiber-softening agent, a smoothing agent, and an antistatic agent.

The aqueous emulsion thus obtained is excellent in mechanical stability, freezing stability, and high-temperature standing stability. It can be advantageously used in applications such as a cement/mortar admixture, a cement/mortar coating material, a raw material for civil engineering, a coating material, an adhesive, a tacky adhesive (pressure-sensitive adhesive), a fiber-processing agent, a paper-processing agent, a binder for an inorganic material, a modifier for a resin such as vinyl chloride, an agent for fixing/stabilizing viscous soil such as a sludge and an industrial waste, a removable coating material for surface protection and a cosmetic.

Especially preferred of these are the cement/mortar admixture, the cement/mortar coating material, the raw material for civil engineering, the coating material, and the like. Use of the aqueous emulsion in these applications takes advantage of the mechanical stability thereof. Furthermore, it is especially preferred to use as an adhesive or tacky adhesive (pressure-sensitive adhesive) while taking advantage of the excellent water resistance and tackiness/adhesiveness thereof. Examples of the target adherend include wood, paper, plastic and fiber.

When used as an adhesive, the aqueous emulsion of the invention by itself can be used as a one-component type adhesive. The aqueous emulsion is generally regulated so as to have a resin concentration of preferably 20% by weight or more, more preferably 45% by weight or more.

When the resin concentration is less than 20% by weight, there are cases where drying requires a prolonged time period or where the aqueous emulsion excessively infiltrates into the adherend such as wood and this tends to result in a reduced adhesive strength, thus is not undesirable.

The aqueous emulsion of the invention can be converted to a redispersible synthetic-resin powder by removing water from the emulsion. Methods for the water removal are not particularly limited. Examples thereof include spray drying, drying by heating, drying by blowing, freeze drying, and drying with impulse impact wave. Industrially, spray drying is preferred.

For the spray drying, an ordinary spray dryer in which a liquid is sprayed and dried can be used. Examples thereof with respect to the type of spraying include a disk type and a nozzle type, and any of such types may be used. As a heat source, use may be made of hot air, heated steam, etc.

A drying condition is suitably selected according to the size and kind of the spray dryer, the concentration, viscosity and flow rate of the aqueous emulsion, etc. A drying temperature of 80° C. to 150° C. is suitable. When the drying temperature is less than 80° C., it is not sufficiently dried. When the drying temperature is more than 150° C., an alteration is generated by heat of the polymer. Both cases are not preferred. The drying temperature is more preferably 100 to 140° C.

There is a possibility that the particles of the redispersible synthetic-resin powder might cake each other and aggregate during storage to form a block. It is therefore preferred to use an anti-caking agent in order to improve storage stability. The anti-caking agent may be added to and evenly mixed with the emulsion powder after spray drying. However, it is preferred that the emulsion, when spray-dried, should be sprayed in the presence of the anti-caking agent from the standpoints of attaining even mixing and obtaining an anti-caking effect. It is especially preferred to simultaneously spray the both of them to dry.

The anti-caking agent preferably is an inorganic powder of a fine particle. Examples thereof include calcium carbonate, clay, silicic acid anhydride, aluminum silicate, white carbon, talc and alumina white. Especially preferred are silicic acid anhydride, aluminum silicate, calcium carbonate and the like each having an average particle diameter of about 0.01 to 0.5 μm. The amount of the anti-caking agent to be used is not particularly limited. However, the amount thereof is preferably 2 to 20% by weight based on the emulsion powder.

A redispersible synthetic-resin powder is thus obtained. By adding this powder to water and stirring the mixture, the powder can be easily re-emulsified. The redispersion emulsion thus obtained can be used in the same as the emulsion and also has high mechanical stability.

Like the aqueous emulsion, the redispersible synthetic-resin powder is useful in applications such as a cement/mortar admixture, a cement/mortar coating material, a raw material for civil engineering, a coating material, an adhesive, a tacky adhesive (pressure-sensitive adhesive), a fiber-processing agent, a paper-processing agent, a binder for an inorganic material and a cosmetic. In particular, the redispersible synthetic-resin powder of the invention is exceedingly useful as an admixture for cement or mortar. This application is explained below.

When used as an admixture for cement or mortar, it is preferred to use in an amount around 20 parts by weight (5 to 30 parts by weight, more preferably 10 to 30 parts by weight) based on 100 parts by weight of the cement from the standpoint of property of the obtained hardened material, etc. When economical standpoint also is taken into account, it is preferred to use in an amount around 10 parts by weight (5 to 15 parts by weight, more preferably 8 to 12 parts by weight).

Examples of methods for incorporating the synthetic-resin powder include a method in which it is mixed (incorporated) beforehand with cement, a method in which it is mixed (incorporated) beforehand with water, and a method in which it is mixed simultaneously with cement and water.

EXAMPLES

The invention will be explained below in detail by reference to Examples. However, the invention should not be construed as being limited to the following Examples only.

In the following, "%" means by weight unless otherwise indicated.

Production Example 1

PVA-Based Resin (A1)

Into a reaction vessel equipped with a reflux condenser, dropping funnel, and stirrer were added 800 g of vinyl acetate, 1,200 g of methanol, and 96 g (6% by mole) of 3,4-diacetoxy-1-butene. Azobisisobutyronitrile was added thereto in an amount of 0.6% by mole (based on the vinyl acetate added). It was heated with stirring in a nitrogen stream to initiate polymerization. At the time when the polymerization rate of the vinyl acetate reached 95%, m-dinitrobenzene and methanol for dilution and cooling were added in given amounts to terminate the polymerization. Subsequently, the vinyl acetate monomer remaining unreacted was removed from the system by bubbling methanol vapor into the system. Thus, a methanol solution of a copolymer was obtained.

Subsequently, the solution was diluted with methanol to regulate the concentration thereof to 50%. This was added into a kneader, and a 2% methanol solution of sodium hydroxide was added thereto in an amount of 10 mmol based on 1 mol of the sum of the vinyl acetate and 3,4-diacetoxy-1-butene in the copolymer while keeping the temperature of the solution at 40° C. to conduct saponification. With the progress of the saponification, a saponification product precipitated. At the time when the precipitate became a particle form, it was taken out by filtration. This was sufficiently washed with methanol and dried in a hot-air dryer to obtain a PVA-based resin (A1).

The PVA-based resin (A1) obtained was examined for residual ester group amount by determining the consumed amount of an alkali required by hydrolyzing the residual vinyl acetate and 3,4-diacetoxy-1-butene. As a result, the residual ester group amount was found to be 2.5% by mole. The average degree of polymerization was determined in accordance with JIS K 6726 and was found to be 300. The content of a 1,2-diol structure unit was determined through a calculation after complete saponification and subsequent analysis by $^1$H-NMR, and was found to be 5.9% by mole. For the NMR measurement, use was made of "AVANCE DPX400" manufactured by Bruker Japan Co., Ltd.

Production Example 2

PVA-Based Resin (A2)

800 g of vinyl acetate, 1,200 g of methanol, and 64 g (4% by mole) of 3,4-diacetoxy-1-butene were added, and 0.4% by mole (based on the vinyl acetate added) azobisisobutyronitrile was used to conduct polymerization in the same manner as in Production Example 1. The polymerization rate of the vinyl acetate was 96%.

Subsequently, saponification, washing, and drying were conducted in the same manners as in Production Example 1, except that the amount of the sodium hydroxide to be added was changed to 8 mmol based on 1 mol of the sum of the vinyl acetate and 3,4-diacetoxy-1-butene in the copolymer. Thus, a PVA-based resin (A2) was obtained.

The PVA-based resin (A2) obtained had a residual ester group amount of 6.0% by mole and an average degree of polymerization of 350. The content of a 1,2-diol structure unit therein was 4.0% by mole.

Production Example 3

PVA-Based Resin (A3)

800 g of vinyl acetate, 1,200 g of methanol, and 24 g (1.5% by mole) of 3,4-diacetoxy-1-butene were added, and 0.5% by mole (based on the vinyl acetate added) azobisisobutyronitrile was used to conduct polymerization in the same manner as in Production Example 1. The polymerization rate of the vinyl acetate was 95%.

Subsequently, saponification, washing, and drying were conducted in the same manners as in Production Example 1. Thus, a PVA-based resin (A3) was obtained.

The PVA-based resin (A3) obtained had a residual ester group amount of 2.2% by mole and an average degree of polymerization of 450. The content of a 1,2-diol structure unit therein was 1.5% by mole.

Production Example 4

PVA-Based Resin (A4)

1,000 g of vinyl acetate, 900 g of methanol, and 16 g (0.8% by mole) of 3,4-diacetoxy-1-butene were added, and 0.4% by mole (based on the vinyl acetate added) azobisisobutyronitrile was used to conduct polymerization in the same manner as in Production Example 1. The polymerization rate of the vinyl acetate was 92%.

Subsequently, saponification, washing, and drying were conducted in the same manners as in Production Example 1, except that the resin concentration was changed to 40% and that the amount of the sodium hydroxide to be added was changed to 7 mmol based on 1 mol of the sum of the vinyl acetate and 3,4-diacetoxy-1-butene in the copolymer. Thus, a PVA-based resin (A4) was obtained.

The PVA-based resin (A4) obtained had a residual ester group amount of 2.5% by mole and an average degree of polymerization of 750. The content of 1,2-diol structure unit therein was 0.7% by mole.

Production Example 5

PVA-Based Resin (A5)

A methanol solution of polyvinyl acetate (average degree of polymerization, 300 (determined in accordance with JIS K6726 after complete saponification of the polyvinyl acetate)) obtained by solution polymerization was regulated so as to have a concentration of 50%. This solution was added into a kneader, and a 2% methanol solution of sodium hydroxide was added thereto in an amount of 10 mmol based on 1 mol of the vinyl acetate structure unit in the polymer while keeping the temperature of the solution at 40° C. to conduct saponification. With the progress of saponification, a saponification product precipitated. At the time when the precipitate became a particle form, it was taken out by filtration. This was sufficiently washed with methanol and dried in a hot-air dryer. Thus, a PVA-based resin (A5) was obtained, which had a residual ester group content of 2.8% by mole.

Production Example 6

PVA-Based Resin (A6)

1,500 g of vinyl acetate, 75 g of methanol, and 30 g (1.0% by mole) of 3,4-diacetoxy-1-butene were added, and 0.0015% by mole (based on the vinyl acetate added) azobisisobutyronitrile was used to conduct polymerization in the same manner as in Production Example 1.

Subsequently, saponification, washing, and drying were conducted in the same manners as in Production Example 1, except that the resin concentration was changed to 20% and that the amount of the sodium hydroxide to be added was changed to 10 mmol based on 1 mol of the sum of the vinyl acetate and 3,4-diacetoxy-1-butene in the copolymer. Thus, a PVA-based resin (A6) was obtained.

The PVA-based resin (A6) obtained had a residual ester group amount of 2.4% by mole and an average degree of polymerization of 2,900. The content of a 1,2-diol structure unit therein was 1.0% by mole.

Example 1

Into a separable flask equipped with a stirrer, reflux condenser, dropping funnel, and thermometer were added 83 parts of water, 12 parts of the PVA-based resin (A1) obtained in Production Example 1, 0.02 parts of sodium acetate as a pH regulator, and 18 parts of monomers to be polymerized (methyl methacrylate/n-butyl acrylate=60/40 (ratio by weight)). The temperature in the flask was elevated to 60° C. with stirring. During this heating, 5 parts of a 1% aqueous solution of ammonium persulfate was added while replacing the atmosphere in the flask with a nitrogen gas to initiate polymerization. Initial polymerization was conducted for 30 minutes. 102 parts of the remaining monomer to be polymerized was added dropwise over 4 hours, and 5 parts of a 1% ammonium persulfate aqueous solution was added four times at intervals of 1 hour to conduct polymerization. Thereafter, this was aged at 75° C. for 1 hour and then cooled to obtain an aqueous emulsion of a methyl methacrylate/n-butyl acrylate copolymer. This emulsion had a solid content of 55%.

The aqueous emulsion obtained above was evaluated for the following properties. The results obtained are shown in Table 1.
(Polymerization Stability)

The emulsion obtained was diluted with water and filtered through a 100-mesh metal sieve. The coarse particle remaining on the metal sieve was dried at 105° C. for 3 hours, and a dry weight thereof (X g) was determined. An amount of coarse particle (%) was calculated using the following equation and used as an index to polymerization stability.

Amount of coarse particle (%)=[(X (g))/(weight of solid matter in emulsion (g))]×100

(Mechanical Stability)

Using a Maron tester manufactured by Yasuda-Seiki-Seisakusho Ltd., a measurement was made under the following conditions.

Resin content: 20%
Used amount: 50 g
Rotation speed: 100 rpm (±20)
Time: 10 min
Load: 40 kgf The emulsion which had undergone the test was filtered through an 80-mesh metal sieve, and the dry weight of the aggregate on the metal sieve (W g) was measured. The amount of the aggregate generated (%) was determined using the following equation. It was evaluated based on the following criteria.

Amount of aggregates generated (%)=($W$(g))/[(50 (g))×(resin content of emulsion (20%))]×100

A ... (amount of aggregates generated)<0.10
B ... 0.10≦(amount of aggregates generated)<1.00
C ... 1.00≦(amount of aggregates generated)
(Freezing Stability)

50 g of the emulsion obtained was placed in a 100-mL polymer container, and this container was allowed to stand in a −15° C. freezing chamber for 16 hours to freeze the emulsion. Thereafter, this was allowed to stand in a 25° C. thermostatic chamber for 8 hours to thaw the emulsion. This cycle was repeated, and the number of cycles required for the emulsion to come not to recover the emulsion state after thawing, i.e., to come to separate into a solid matter and water after thawing, was counted. It was evaluated based on the following criteria.

A ... 10 times or more
B ... 4 to 9 times
C ... 3 times or less
(High-Temperature Standing Stability)

In a 450-mL mayonnaise bottle was placed 300 g of the emulsion obtained. The viscosity of the emulsion at 25° C. ($V_0$) was measured with a BROOKFIELD type viscometer. The emulsion was allowed to stand in a 60° C. thermostatic chamber for 10 days and then measured for viscosity at 25° C. ($V_{20}$). The ratio between these viscosities ($V_{20}/V_0$) was determined.
(Water Resistance Adhesive Property)

The emulsion obtained was applied to a base paper for a paper tube in an amount of 30 g/m². Immediately thereafter, this was adhered to another base paper for a paper tube, and this was pressed three times with a hand roller and then allowed to stand at room temperature for 24 hours. The adhesion sample was immersed in 30° C. water for 24 hours and then examined for the state of being bonded. The sample was evaluated according to the following criteria.

A ... adherend failure
B ... partial adherend failure
C ... peeling
(Mechanical Stability of Redispersion Emulsion)

A fine powder of silicic acid anhydride (anti-caking agent) was added to the emulsion obtained in an amount of 5% by weight based on the solid matter in the emulsion. This was spray-dried in 120° C. hot air to obtain a redispersible resin powder. 20 parts of the resin powder obtained was added to 80 parts of deionized water, and this was stirred to obtain a redispersion emulsion. The mechanical stability of this redispersion emulsion obtained was evaluated in the same manner as described above.

Examples 2 to 4

Aqueous emulsions were obtained in the same manner as in Example 1, except that the PVA-based resins (A2 to A4) obtained in Production Examples 2 to 4 were used. These were evaluated in the same manners. The results obtained are shown in Table 1.

Comparative Examples 1 and 2

Aqueous emulsions were obtained in the same manner as in Example 1, except that the PVA-based resins (A5 and A6) obtained in Production Examples 5 and 6 were used. These were evaluated in the same manners. The results obtained are shown in Table 1.

TABLE 1

|  | Polymerization stability | Mechanical stability | Freezing stability | High-temperature standing stability | Water resistance adhesive property | Mechanical stability of redispersion emulsion |
|---|---|---|---|---|---|---|
| Example 1 | 0.015 | A | A | 1.1 | A | A |
| Example 2 | 0.042 | A | A | 1.3 | A | A |
| Example 3 | 0.160 | B | B | 1.6 | A | A |
| Example 4 | 0.272 | B | B | 1.5 | B | B |
| Comparative Example 1 | * | — | — | — | — | — |
| Comparative Example 2 | 1.830 | C | C | 3.2 | C | C |

* Aggregation occurred during polymerization.

While the invention has been described in detail and with reference to specific embodiments thereof, it will be apparent to one skilled in the art that various changes and modifications can be made therein without departing from the spirit and scope thereof.

This application is based on a Japanese patent application filed on Sep. 29, 2004 (Application No. 2004-283771) and a Japanese patent application filed on Sep. 29, 2005 (Application No. 2005-283200), the contents thereof being herein incorporated by reference.

INDUSTRIAL APPLICABILITY

The aqueous emulsion of the invention is excellent in emulsion polymerization stability when produced, and is excellent in mechanical stability, freezing stability, stability to long-term standing at high temperatures, water resistance adhesive property, etc., and also can be converted into a powder by water removal. Since this resin powder, upon redispersion in water, gives an emulsion having excellent mechanical stability, the aqueous emulsion and the resin powder obtained from the aqueous emulsion are useful in applications as a cement/mortar admixture, a cement/mortar coating material, a raw material for civil engineering, a coating material, an adhesive, a tacky adhesive (pressure-sensitive adhesive), a fiber-processing agent, a processing agent for general paper, a processing agent for ink-jet printing paper, a binder for an inorganic material, a cosmetic and the like. In particular, this is exceedingly useful as an admixture for cement or mortar.

The invention claimed is:

1. An aqueous emulsion comprising:
   a polyvinyl alcohol-based resin (A) comprising a 1,2-diol component in a side chain and having an average degree of polymerization of 50 to 500; and
   a polymer (B) that is obtained by emulsion-polymerizing a (meth)acrylic acid ester-based monomer in the presence of the polyvinyl alcohol-based resin (A) as an emulsifier.

2. The aqueous emulsion according to claim 1, wherein the polyvinyl alcohol-based resin (A) comprises a 1,2-diol structure unit represented by the following formula (1):

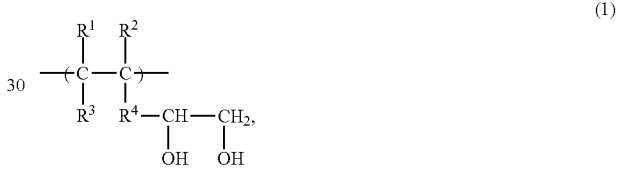

wherein each of $R^1$, $R^2$, and $R^3$ independently represents a hydrogen atom, and $R^4$ represents a single bond or an alkylene group having 1 to 3 carbon atoms.

3. The aqueous emulsion according to claim 1, wherein a content of the 1,2-diol structure unit in the polyvinyl alcohol-based resin (A) is 1 to 15% by mole.

4. A redispersible resin powder formed from the aqueous emulsion according to claim 1.

5. An adhesive comprising the aqueous emulsion according to claim 1.